United States Patent Office 3,322,486
Patented May 30, 1967

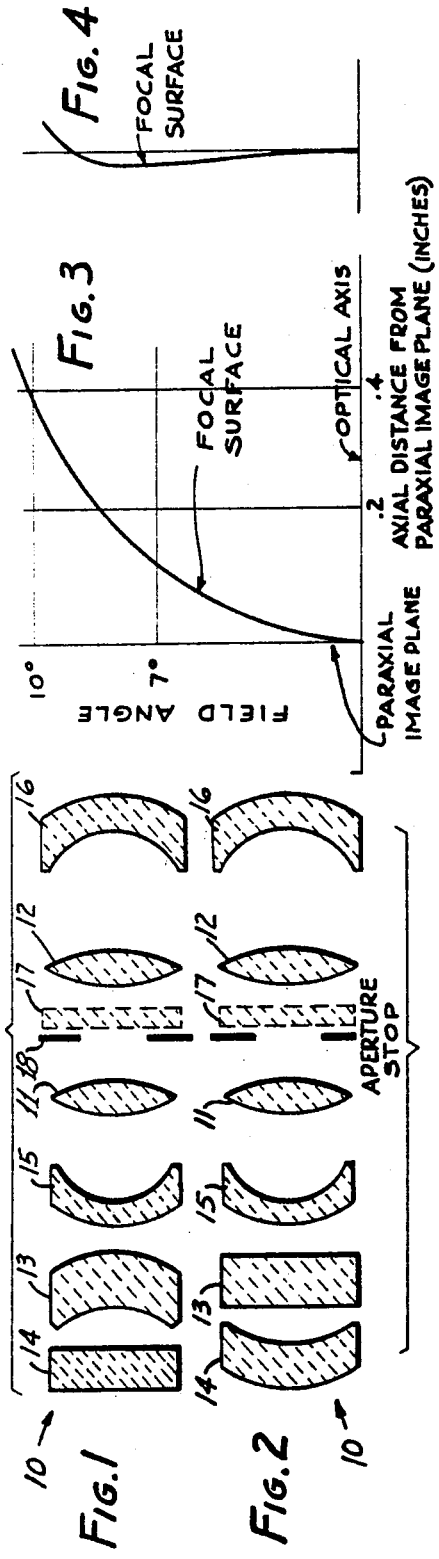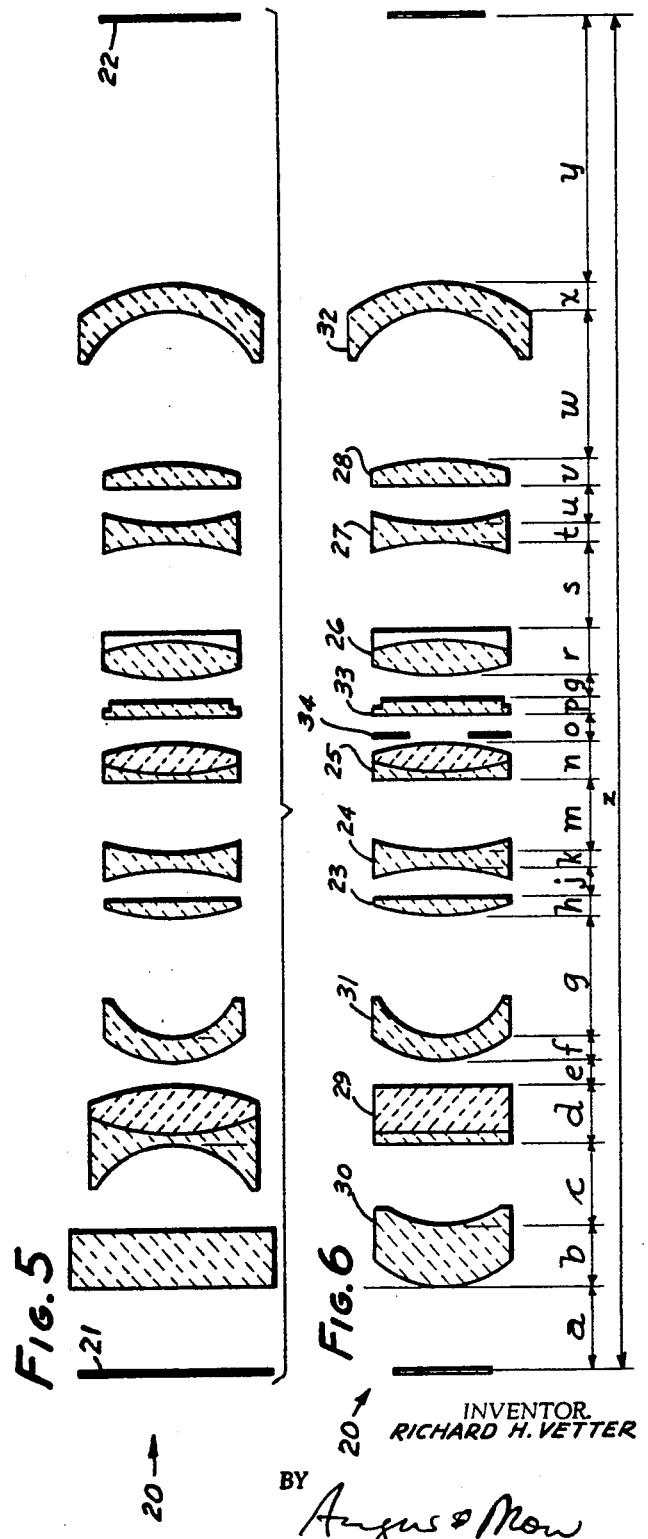

3,322,486
ANAMORPHOSING LENS SYSTEM
Richard H. Vetter, 1260 Las Lomas Ave.,
Pacific Palisades, Calif. 90272
Filed Aug. 15, 1963, Ser. No. 302,424
3 Claims. (Cl. 350—181)

This invention relates to an optical lens system for creating high-quality distorted images.

There are numerous potential applications for lens systems which can function to distort an object in a single plane and which provide distortion in amounts which are a function of the angular displacement from the central axis. However, heretofore there has been no suitable lens system available, and the needs have not been met. An example of one application for such a lens system is found in connection with the preparation and projection of motion picture films on deeply curved screens. The more deeply curved a motion picture screen is, in general the greater the feeling of participation by the audience, and of course the greater the peripheral vision. Screens which are radically curved, as for example a circular arc of 130°–150°, cannot presently be used with single film techniques which utilize only lenses throughout the photographic, printing, and projection portions of the system. The problem arises because, in projecting an image from a single source over an entire, deeply curved screen, the angle of incidence between the screen and the projected ray varies greatly, and distortion is accordingly introduced in greatly varying amounts. Attempts have been made to overcome this situation by providing multiple projectors, and multiple, edge-registered images, projected from widely separated locations. Still, to a person in the audience, the effect includes considerable distortion, particularly at the edges of the screen. Much of this difficulty could be avoided, and an image from a single film can be projected over a very wide screen if the projected image can be suitably distorted in order to project an image onto the screen which is corrected for the varying angle of incidence. It is an object of this invention to provide a printing lens which can take a suitably-obtained, wide-angle image and suitably distort it such that on projection onto a deeply curved screen, the viewer is provided with an image which is satisfactory to him.

The distortion of optical images to create extended fields has been widely used in motion pictures. The conventional technique is to "compress" the image in its horizontal cross-section by adding an afocal cylindrical lens system in front of a standard camera lens which has spherical surfaces. In principle, this afocal attachment is a cylindrical lens rendition of the conventional Galilean telescope, with its eyepiece end facing toward the incident light. The compressed, or anamorphosed, image obtained in this manner is retained through various intermediate printing steps to the final positive print. It is restored to its undistorted form by projecting the image through a cylindrical lens attachment which is similar to that which was used on the camera. Anamorphosing prisms are commonly used in place of cylindrical lens attachments in order to expand the image.

At least to a close approximation, the distortion created by the above conventional means is constant over the entire horizontal cross-section of the field. This means that in the projection of the image onto a deeply curved screen, the image is likely to be distorted to the viewer in many regions of an audience of commercially practical size. An object of this invention is to provide a system wherein the distortion varies with the field angle, increasing toward the edge of the field along the horizontal, so that the increasing angle between the line of sight to the screen at the edges and the screen itself is compensated to a viewer.

In a suitable system according to this invention, the original camera image will be substantially distortion-free, but in the printing of the image, the lens system of this invention is used, whereby the image is given a horizontal compression that increases with the distance off the central axis. The magnification of objects which are of unit horizontal dimension at the center of the picture will preferably be about .8 at the sides. There is no distortion of vertical dimensions. Upon projecting this distorted image onto a deeply curved screen from a rearly-disposed, projection booth, the image will appear undistorted. In this way, much longer focal length lenses can be used for projection than would otherwise be necessary in order to provide an undistorted picture to an audience which is located near the screen. It is presently known to provide the type of distortion created by this invention in narrow field systems, by making independent cylindrical lens renditions of all elements and lenses from meridional spherical cross-sections, one of which is distortion-free, and the other of which lies at right angles to it, the latter containing the desired distortion. Known examples of this solution are found in soundtrack imaging systems.

In the class of application to which this invention relates, such a solution is objectionable from at least two major standpoints. The first is that if the image is to have high quality, then large quantities of positive and negative surface powers are necessary in order to control aberrations. However, in cylindrical elements, these powers are zero in the plane at right angles to these surface powers. Effectively, the lenses constitute windows of variable thickness as parallel sections are taken from the axis outward. As a rule, the variable thickness of these sections for oblique off-axis rays lead to poor image quality, not the least disadvantage lies in astigmatism. In this connection, it should be noted that in the conventional anamorphosing lens elements previously referred to, there is near-freedom from the effects of variable thickness of window sections, because the subject being photographed is located at such a distance from the lens that image-forming rays are nearly parallel. However, without the assistance of long object distances, anamorphosing attachments would be greatly handicapped and would give poor results. A second disadvantage of conventional systems is that cylindrical lenses are difficult and costly to produce to precision tolerances which are comparable to those of spherical lenses.

In the instant invention, there is utilized a combination of spherical and cylindrical lens components which provides substantial distortion in a single plane of magnitude which increases as the field angle from the central axis becomes larger. At the same time, this system provides corrections for astigmatism and field curvature. Good corrections are also attainable for spherical aberration, coma, and chromatism without sacrifice to the corrections obtained for astigmatism and field curvature.

A lens system according to this invention includes a cylindrical lens of weak power whose primary function is to create the desired distortion. Additional lenses are provided for correcting field curvature, spherical aberration, coma, chromatism and astigmatism.

This invention will be fully understood from the following detailed description and the accompanying drawings in which:

FIGS. 1 and 2 are views of a schematic lens system according to the invention taken in the horizontal and vertical planes, respectively;

FIGS. 3 and 4 are graphs showing certain characteristics of individual portions of the invention; and FIGS. 5 and 6 are horizontal plane and vertical plane renditions, respectively, of a practical lens system according to the invention.

Referring now to FIGS. 1 and 2, there is shown a schematic illustration of a lens system 10 according to the invention. In these figures, the object plane is at the left, and the image plane is to the right. FIG. 1 is a horizontal section, and FIG. 2 is a vertical section. Images will be anamorphosed in the horizontal plane and will remain unaffected in the vertical plane in this system.

Elements 11 and 12 are spherical lenses, each having a net positive power. Element 13 is a cylindrical lens of weak power, the primary function of which is the creation of the desired distortion. Element 14 is located between element 13 and the object plane. It is also a cylindrical lens of weak power.

Elements 15 and 16 are negative meniscus pairs, each having a very weak power. Each is steeply bent.

Element 17 is optional. It is a weak cylindrical lens whose cylindrical axes are parallel to the axis of element 14. The aperture stop 18 of the system is preferably located between elements 11 and 12, and when element 17 is used, then between elements 11 and 17.

Elements 11 and 12 principally perform the task of relaying the image from the object to the image plane, and have no part in distorting the image. As will be seen later in connection with FIGS. 5 and 6, they will ordinarily be formed of lenses of the general type illustrated, but different in specific identity than that which is shown schematically. Preferably, these lenses will be formed of multiple components which correct for chromatism and rotationally symmetric astigmatism. They are slightly under-corrected for field curvature and spherical aberration to compensate for the over-correction that will prevail when elements 13, 14, 15 and 16 are added to the system.

Element 13 is located as near to the object plane as possible, consistent with the space requirements for element 14, as well as for providing a moderate working distance between element 14 and the object plane. Element 13 will in general have a weak power. However, because of its steep bending, large amounts of high-order aberration of the pupil are created. Distortion is the direct result of spherical aberration of the pupil. Therefore, element 13 is bent so as to bring the higher orders into play. Accompanying the distortion created by this means is high-order field curvature. Owing to the steep angles of incidence and refraction, the image surface will then acquire a severe curl, such as illustrated in FIG. 3, which plots the field angle from the central axis versus the axial distance from the paraxial image plane. The elimination of this curl, together with the retention of the distortion, constitutes one of the novel features of this invention.

The elimination of the curl of the image surface of element 13 is brought about by the introduction of elements 15 and 16. The focal lengths of these elements are only $\frac{1}{15}$ to $\frac{1}{20}$ the equivalent focal length of the entire system. Much of the effectiveness of these elements in compensating for the image-surface curl is derived from their very steep meniscus form. The complete eradication of field curvature depends upon achieving an exact compensation for all orders of the field curvature aberration. The failure to accomplish this results in only an approximately flattened field. An example of a field which is only approximately flattened is shown in FIG. 4 in which the abscissa and ordinate are the same as those in FIG. 3. It is a typical tangential field curvature plot for commercial photographic objectives. This invention overcomes the disadvantage illustrated by this graph.

The novelty involved in the use of elements 15 and 16 is their singular effectiveness in attaining a complete field curvature correction so that the graph of FIG. 4 would be a vertical straight line. One design procedure that may be followed is first to establish an approximate form for the meniscus lens elements 15 and 16 in order to give an approximate correspondence with element 13 for angles of incidence and refraction of the principal rays near the edge of the field. The powers of elements 15 and 16 are then varied slightly to obtain the best surface fit. Several bending and power changes may be necessary to realize an optimum compensation.

The purpose in having two compensating elements for field curvature instead of one is to eliminate coma that would be introduced by a single element. The amount of coma attributable to element 13 is very small. Thus, to remove the coma associated with a single element which replaces elements 15 and 16, but retaining the field curvature compensation, a pair of meniscus lenses hemisymmetrically disposed about the stop are utilized in a practical lens system. The principle of eliminating coma and other lateral aberrations by this method is well known in the optical design art.

The function of element 14 is to bring the equivalent focal length of the system perpendicular to the distortion plane into equality with that prevailing in the distortion plane. For the specific design illustrated by FIGS. 5 and 6, this focal length should be approximately one-tenth the equivalent focal length of the entire system. So as not to introduce distortion in this plane, the bending of element 14 is opposite to that of element 13. Owing to its weak power and proximity to the object plane, its aberrations have little effect on image quality.

If the power of element 14 is chosen to equalize focal lengths in both cross-sections, the back focal lengths will be slightly different in the two planes. In other words, there will be axial astigmatism present in the image. The power of element 14 could be adjusted to eliminate astigmatism, but this would result in slightly different paraxial focal lengths in the two image cross-sections. For some applications, this would be tolerable. Where it is not tolerable, it is readily removed by introducing element 17 in the system between elements 11 and 12. Element 17, when used, is cylindrical with its axis parallel to element 14. Since it lies in the parallel-light section of the system, the back focal length can be changed in the plane containing its curvature without causing any change in the back focal length in the plane at right angles to it. In this way, axial astigmatism can be completely removed. For the design shown in FIGS. 5 and 6, the lens power required to eliminate axial astigmatism is only $\frac{1}{35}$ of the equivalent power of the entire system.

FIGS. 5 and 6 illustrate a commercially practical system 20 according to the invention. Object plane 21 and image plane 22 are shown, the function of the lens system being to print the image of an object from object plane 21 onto a positive print at image plane 22. It will be observed that FIG. 5, which is a view taken in the horizontal plane of the system including the central axis, shows that the object and image planes have different sizes. For a 52.5 mm. object, the image will be 48.07 mm. long. The image is not changed in the vertical plane, an example being a 23 mm. high object which is perceived in the image plane as an image 23 mm. high. In this system, the field angle being covered in the plane of distortion is approximately 2.2 times that in the plane at right angles with it.

Full details of the presently preferred embodiment of the invention are shown in FIGS. 5 and 6, in which element 11 of FIGS. 1 and 2 is represented by elements 23, 24 and 25. These three elements constitute an astigmatic construction resembling the telephotographic objective designed by Deser. The general form of this objective is adopted because the location of the aperture stop of the lens is designated to be in the region of its rear element. This feature is important to the extent that it is preferred to maintain a condition of hemisymmetry about the aperture stop for all spherical elements.

Element 12 of FIG. 1 is represented by elements 26, 27 and 28 which are scaled versions of elements 23, 24 and 25.

Element 13 of FIGS. 1 and 2 is represented by a doublet lens 29 which is provided to correct for longitudinal color. Element 14 is represented by element 30, element 15 by element 31, and element 16 by element 32. Element 17 is represented by element 33, and the stop 18 by stop 34. Specifications and locations for all elements of FIGS. 5 and 6 are provided in the following tables:

tion with FIGS. 1 and 2, and utilizing the specific construction of FIGS. 5 and 6 and constructions which are derivable therefrom, can be utilized to print distorted images from any suitable object and most suitably from wide-angle objects so that the distorted image derived at the image plane can be projected by normal projection

| Lens | Plane | Glass Characteristics: Index of Refraction—$\nu$ number (index of dispersion) | $R_1$ (first face from left) | $R_2$ (second face from left) | d (Thickness of lens sections) | Axial Thickness of total lens | Clear Aperture | Diameter of Lens |
|---|---|---|---|---|---|---|---|---|
| 30 | Horizontal Section | 517–645 | ∞ | ∞ | .660 | .660 | 2.268 | 2.49 |
|  | Vertical Section |  | 1.314 | 1.014 | .660 | .660 | 1.278 | 1.372 |
| 29 | Horizontal Section | Left-hand segment 523–585 | −.945 | 2.534 | .106 |  | 1.530 | 1.650 |
|  |  |  |  |  |  | .599 |  |  |
|  |  | Right-hand segment 525–512 | 2.534 | −1.545 | .493 |  | 1.576 | 1.650 |
|  | Vertical Section | Left-hand segment 523–585 | ∞ | ∞ | .106 |  | .998 | 1.250 |
|  |  |  |  |  |  | .599 |  |  |
|  |  | Right-hand segment 525–512 | ∞ | ∞ | .493 |  | .996 | 1.250 |
| 31 |  | 517–645 | .807 | .709 | .2272 | .2272 | 1.416 | 1.490 |
| 23 |  | 649–339 | 2.322 | −17.283 | .144 | .144 | 1.024 | 1.170 |
| 24 |  | 583–418 | −1.6619 | 2.340 | .0753 | .0753 | .928 | 1.015 |
| 25 |  | 649–339 | −11.539 | 2.081 | .0780 |  | .950 |  |
|  |  |  |  |  |  | .3644 |  | 1.015 |
|  |  | 617–550 | 2.081 | −1.4680 | .2864 |  | .964 |  |
| 33 | Horizontal Section | 517–645 | ∞ | ∞ | .134 | .134 | 1.112 | 1.320 |
|  | Vertical Section |  | ∞ | −48.25 | .134 | .134 | 1.038 | 1.320 |
| 26 |  | Left-hand segment 617–550 | 1.7063 | −2.419 | .3329 |  | 1.206 | 1.275 |
|  |  |  |  |  |  | .4236 |  |  |
|  |  | Right-hand segment 649–339 | −2.419 | 13.413 | .0907 |  | 1.194 | 1.275 |
| 27 |  | 583–418 | −2.719 | 1.9321 | .0874 | .0874 | 1.152 | 1.275 |
| 28 |  | 649–339 | 20.089 | −2.699 | .168 | .168 | 1.278 | 1.405 |
| 32 |  | 517–645 | −.824 | −.938 | .2635 | .2635 | 1.722 | 1.835 |

|   | Inches |
|---|---|
| a | .8928 |
| b | .660 |
| c | .8067 |
| d | .599 |
| e | .2662 |
| f | .2272 |
| g | 1.2464 |
| h | .144 |
| j | .2178 |
| k | .0753 |
| m | .7574 |
| n | .3644 |
| o | .2689 |
| p | .134 |
| q | .1775 |
| r | .4236 |
| s | .8804 |
| t | .0874 |
| u | .2528 |
| v | .168 |
| w | 1.4481 |
| x | .2635 |
| y | 3.3016 |
| z | 13.6630 |

The aperture stop is approximately 0.50 inch in diameter. All dimensions in the foregoing table are in inches. It will be recognized that utilizing the foregoing considerations and numerals, the system may be scaled as appropriate.

Inasmuch as the system is designed to work at unit magnification, the focal lengths on each side of the stop are equal. A negative power of the cylindrical elements lengthens the effective focal length of the system to the left of the stop, making it necessary to scale the construction in the second half by a factor approximately 1.16.

It should be noted that except for elements 17 and 33 in FIGS. 1 and 5, respectively, all of the cylindrical elements have been designed to be close to an image conjugate. This is important from the standpoint of the precision required in manufacturing these components. This applies not only to the perfection of surface contours, but also to the centering and aligning of cylindrical axes.

Lens systems utilizing the theory outlined in connection with FIGS. 1 and 2, and utilizing the specific construction of FIGS. 5 and 6 and constructions which are derivable therefrom, can be utilized to print distorted images from any suitable object and most suitably from wide-angle objects so that the distorted image derived at the image plane can be projected by normal projection means onto deeply curved screens, there to provide an even undistorted image on a very deeply curved screen.

This invention is not to be limited by the embodiments shown in the drawings and described in the description which are given by way of example and not of limitation, but only in accordance with the scope of the appended claims.

I claim:

1. An anamorphosing lens having unit magnification in a vertical plane, and a magnification increasingly less than unity in a horizontal plane as a function of the angle from the central axis of the lens, comprising from its objective end: a first and a second cylindrical lens of weak power, with the cylindrical axis of the first cylindrical lens in a vertical plane, and with the cylindrical axis of the second cylindrical lens in a horizontal plane, the first cylindrical lens serving to create the desired distortion, and the second cylindrical lens serving to bring the equivalent focal length of the system perpendicular to the distortion plane into substantial equality with that in the distortion plane; a first steeply bent spherical negative meniscus lens of weak power; a first and a second spherical lens, each of said spherical lenses having a net positive power, said spherical lenses serving to relay the image from the object to the image plane; and a second steeply bent spherical negative meniscus lens of weak power, the meniscus lenses being bent away from each other and serving to reduce coma and to reduce image surface curl introduced by the first cylindrical lens.

2. An anamorphosing lens according to claim 1 in which a weak cylindrical lens is disposed between the first and second spherical lenses, with its cylindrical axis lying in a vertical plane to adjust the back focal length in the plane containing its curvature.

3. An anamorphosing lens having unit magnification in a vertical plane, and a magnification increasingly less than unity in a horizontal plane as a function of the angle from the central axis of the lens comprising from its objective lens on the left a first cylindrical lens (30), a second cylindrical lens (29) in doublet form, a first steeply bent spherical negative meniscus lens (31) of weak power, a first spherical lens group of net positive power and three lenses (23, 24, 25), a weak cylindrical lens (33), a second spherical lens group of net positive power and three lenses (26, 27, 28), one of which is a doublet, and a second steeply bent spherical negative meniscus lens (32) of weak power, the meniscus lenses being oppositely directed along said axis, as follows:

| Lens | Plane | Glass Characteristics: Index of Refraction-$\nu$ number (index of dispersion) | $R_1$ (first face from left) | $R_2$ (second face from left) | $d$ (Thickness of lens sections) | Axial Thickness of total lens |
|---|---|---|---|---|---|---|
| 30 | Horizontal section | 517-645 | ∞ | ∞ | .660 | .660 |
|  | Vertical section |  | 1.314 | 1.014 | .660 | .660 |
| 29 | Horizontal section | Left-hand segment 523-585 | −.945 | 2.534 | .106 |  |
|  |  |  |  |  |  | .599 |
|  |  | Right-hand segment 525-512 | 2.534 | −1.545 | .493 |  |
|  | Vertical section | Left-hand segment 523-585 | ∞ | ∞ | .106 |  |
|  |  |  |  |  |  | .599 |
|  |  | Right-hand segment 525-512 | ∞ | ∞ | .493 |  |
| 31 |  | 517-645 | .807 | .709 | .2272 | .2272 |
| 23 |  | 649-339 | 2.322 | −17.283 | .144 | .144 |
| 24 |  | 583-418 | −1.6619 | 2.340 | .0753 | .0753 |
| 25 |  | 649-339 | −11.539 | 2.081 | .0780 |  |
|  |  |  |  |  |  | .3644 |
|  |  | 617-550 | 2.081 | −1.4680 | .2864 |  |
| 33 | Horizontal section | 517-645 | ∞ | ∞ | .134 | .134 |
|  | Vertical section |  | ∞ | −48.25 | .134 | .134 |
| 26 |  | Left-hand segment 617-550 | 1.7063 | −2.419 | .3329 |  |
|  |  |  |  |  |  | .4236 |
|  |  | Right-hand segment 649-339 | −2.419 | 13.413 | .0907 |  |
| 27 |  | 583-418 | −2.719 | 1.9321 | .0874 | .0874 |
| 28 |  | 649-339 | 20.089 | −2.699 | .168 | .168 |
| 32 |  | 517-645 | −.824 | −.938 | .2635 | .2635 |

References Cited

UNITED STATES PATENTS 1,753,222  5/1929  Timoney.
2,915,942  12/1959  Cook _____ 88—57
2,977,844  4/1961  Winkler _____ 88—57 X
3,046,832  7/1962  Winzenburg.
3,157,883  11/1964  Easter _____ 88—57 X DAVID H. RUBIN, *Primary Examiner.*

JEWELL H. PEDERSEN, JOHN K. CORBIN,
*Examiners.*

UNITED STATES PATENT OFFICE
CERTIFICATE OF CORRECTION

Patent No. 3,322,486　　　　　　　　　　　　May 30, 1967

Richard H. Vetter

It is hereby certified that error appears in the above numbered patent requiring correction and that the said Letters Patent should read as corrected below.

Column 4, line 61, for "astigmatic" read -- anastigmatic --.

Signed and sealed this 13th day of August 1968.

(SEAL)
Attest:

Edward M. Fletcher, Jr.　　　　　　　　　　　EDWARD J. BRENNER
Attesting Officer　　　　　　　　　　　　　　Commissioner of Patents